(12) United States Patent
Kasajima et al.

(10) Patent No.: US 8,636,408 B2
(45) Date of Patent: Jan. 28, 2014

(54) TEMPERATURE MEASUREMENT SYSTEM AND TEMPERATURE MEASUREMENT METHOD

(75) Inventors: Takeo Kasajima, Kawasaki (JP); Kazushi Uno, Kawasaki (JP); Fumio Takei, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/229,933

(22) Filed: Sep. 12, 2011

(65) Prior Publication Data
US 2012/0033709 A1   Feb. 9, 2012

Related U.S. Application Data

(63) Continuation of application No. PCT/JP2009/071302, filed on Dec. 22, 2009.

(30) Foreign Application Priority Data

May 1, 2009   (JP) ................................. 2009-112156

(51) Int. Cl.
    *G01K 11/32*   (2006.01)
(52) U.S. Cl.
    USPC ........................................................ 374/161
(58) Field of Classification Search
    USPC ......... 374/161, 120–121, 124, 128, 100, 150;
    356/23, 22; 73/204.11, 23
    See application file for complete search history.

(56) References Cited

U.S. PATENT DOCUMENTS

| 4,576,486 A | * | 3/1986 | Dils | .............................. 374/131 |
| 4,700,064 A | | 10/1987 | Fujita | ............................. 250/231 |

(Continued)

FOREIGN PATENT DOCUMENTS

| CN | 85107724 | 5/1986 |
| CN | 1973178 | 5/2007 |

(Continued)

OTHER PUBLICATIONS

"Fujitsu Develops Technology Enabling Real-time Multiple-Point Temperature Measurement;" http://www.fujitsu.com/global/news/pr/archives/month/2008/20080404-01.html; Apr. 4, 2008 (6 Sheets total)/p. 2 of specification.

(Continued)

*Primary Examiner* — Lisa Caputo
*Assistant Examiner* — Nasir U Ahmed
(74) *Attorney, Agent, or Firm* — Kratz, Quintos & Hanson, LLP

(57) ABSTRACT

A temperature measurement system includes: a laser light source; an optical fiber; and a temperature measurement unit configured to acquire a measured temperature distribution of a temperature of a temperature measurement area along an installation path of the optical fiber by detecting backscattered light of the incident laser light in the optical fiber, wherein the temperature measurement unit sequentially makes a correction for the measured temperature distribution a plurality of times so as to make a square error between a convolution of a transfer function of the optical fiber along the installation path and the corrected temperature distribution and the measured temperature distribution smaller in each of the corrections, and the temperature measurement unit also replaces a corrected temperature at a specific point of the installation path with an estimated temperature at the specific point in each of the corrections.

20 Claims, 23 Drawing Sheets

(56) References Cited

U.S. PATENT DOCUMENTS

| | | | | |
|---|---|---|---|---|
| 5,178,465 A | * | 1/1993 | Amano et al. | 374/131 |
| 5,308,162 A | * | 5/1994 | Amano et al. | 374/131 |
| 5,604,592 A | * | 2/1997 | Kotidis et al. | 356/493 |
| 5,825,804 A | * | 10/1998 | Sai | 374/137 |
| 6,639,681 B1 | * | 10/2003 | Magne et al. | 356/478 |
| 7,719,666 B2 | | 5/2010 | Kishida et al. | 356/73.1 |
| 7,997,792 B2 | | 8/2011 | Sasaoka et al. | 374/130 |
| 2005/0149264 A1 | * | 7/2005 | Tarvin et al. | 702/6 |
| 2006/0285850 A1 | * | 12/2006 | Colpitts et al. | 398/108 |
| 2007/0220958 A1 | * | 9/2007 | Gotthard et al. | 73/105 |
| 2007/0223556 A1 | * | 9/2007 | Lee et al. | 374/1 |

FOREIGN PATENT DOCUMENTS

| | | |
|---|---|---|
| JP | 5-172656 | 7/1993 |
| JP | 6-109557 | 4/1994 |
| JP | 10-11681 | 1/1998 |
| JP | 3065832 B2 | 5/2000 |
| JP | 2004-28748 A1 | 1/2004 |
| WO | 2008/023695 | 2/2008 |

OTHER PUBLICATIONS

International Search Report for International Application No. PCT/JP2009/071302 dated Mar. 10, 2010.

First Office Action received from the State Intellectual Property Office of the P.R. of China issued Sep. 27, 2012 in counterpart application No. 200980158413.X with English translation (10 pages).

* cited by examiner

TEMPERATURE MEASUREMENT SYSTEM AND TEMPERATURE MEASUREMENT METHOD

CROSS-REFERENCE TO RELATED APPLICATIONS

This application is a continuation of the prior International Patent Application No. PCT/JP2009/071302 filed Dec. 22, 2009, the entire contents of which are incorporated herein by reference.

FIELD

The embodiment discussed herein relates to a temperature measurement system and a temperature measurement method.

BACKGROUND

In a computer room or Internet data center (IDC), there is a tendency that the amount of heat generated from electronic devices such as servers rapidly increases, as the electronic devices are each built in higher density. Thus, it is desired to appropriately cool the electronic devices.

Examples of a method of cooling down the electronic devices include a method of controlling air current in a room for preventing occurrence of an excessively hot part, and a method of cooling the inside of a room by air conditioning.

In order to always keep the cooling state in the room optimum by these methods, it is effective to always monitor temperature measurement points in the room. In particular, if it is possible to figure out a three-dimensional temperature distribution in the room, the cooling state in the room may be kept optimum by controlling the air conditioning or the like by use of the temperature distribution.

One of known methods of measuring such a temperature distribution is a method using an optical fiber for a temperature sensor.

However, although it is relatively easy to measure temperature of a wide area with high accuracy by the temperature measurement using an optical fiber, a method of measuring a temperature of a narrow area such as a server in a data center with high accuracy is not established yet.

Patent Document 1: Japanese Laid-open Patent Publication No. 2004-28748
Patent Document 2: Japanese Laid-open Patent Publication No. 06-109557
Non-Patent Document 1: Fujitsu Laboratories Ltd. PRESS RELEASE "Fujitsu Develops Technology Enabling Real-time Multiple-Point Temperature Measurement" Apr. 4, 2008

SUMMARY

According to an aspect of the following disclosure, a temperature measurement system is provided, the temperature measurement system including: a laser light source configured to output laser light; an optical fiber which is installed in a temperature measurement area and which the laser light enters; and a temperature measurement unit configured to acquire a measured temperature distribution of a temperature of the temperature measurement area along an installation path of the optical fiber by detecting backscattered light of the incident laser light in the optical fiber and to calculate a corrected temperature distribution by correcting the measured temperature distribution, wherein the temperature measurement unit sequentially makes a correction for the measured temperature distribution a plurality of times so as to make a square error between a convolution of a transfer function of the optical fiber along the installation path and the corrected temperature distribution and the measured temperature distribution smaller in each of the corrections, and the temperature measurement unit also replaces a corrected temperature at a specific point of the installation path with an estimated temperature at the specific point in each of the corrections.

According to another aspect of the disclosure, a temperature measurement method is provided, the temperature measurement method including: acquiring a measured temperature distribution of a temperature of a temperature measurement area along an installation path of an optical fiber by causing laser light to enter the optical fiber installed in the temperature measurement area and detecting backscattered light of the laser light in the optical fiber; and acquiring a corrected temperature distribution by correcting the measured temperature distribution, wherein, in the acquiring the corrected temperature distribution, a correction is sequentially made for the measured temperature distribution a plurality of times so as to make a square error between a convolution of a transfer function of the optical fiber along the installation path and the corrected temperature distribution and the measured temperature distribution smaller in each of the corrections, and a corrected temperature at a specific point of the installation path is replaced with an estimated temperature at the specific point in each of the corrections.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENT

Hereinafter, a description is given of the present embodiment in detail with reference to the attached drawings.

Figure 1:
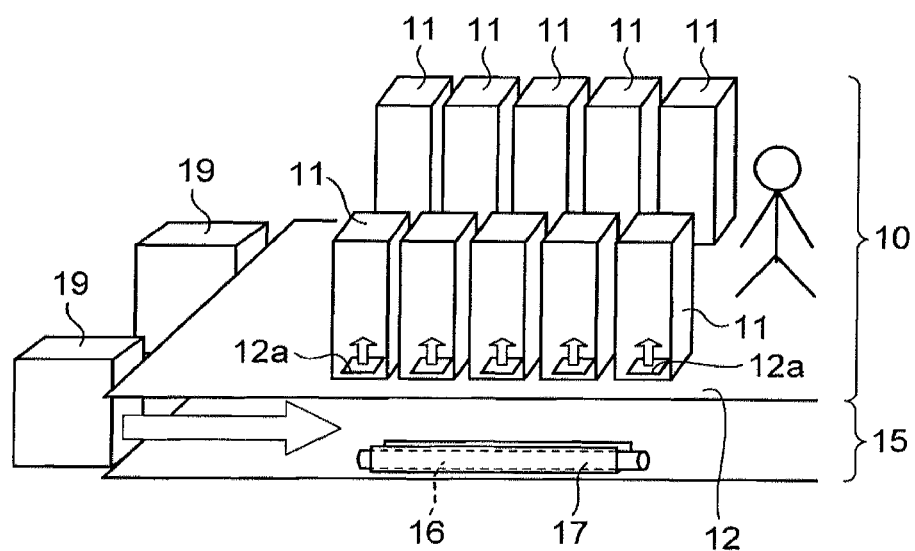
FIG. 1 is a schematic diagram illustrating a structure of a computer room to which the present embodiment is applied.

FIG. 1 is a schematic diagram illustrating a structure of a computer room to which the present embodiment is applied.

The inside of the computer room is broadly divided into a device installation area 10 and a free access floor 15.

In the computer room, a plurality of server racks 11 are disposed in the device installation area 10, and a plurality of computers such as blade servers are stored in each of the racks 11. In addition, an aisle for a manager to pass through and a management space used in management of the computers are provided between the server racks 11.

Meanwhile, the free access floor 15 is provided under the floor of the device installation area 10. Various cables 16 such as a power cable, a communication cable and the like which are connected to each of the racks 11 are disposed in the free access floor 15 while being stored in a cable duct 17.

Cold air is supplied from air conditioners 19 to the free access floor 15. The cold air is then supplied to the inside of the device installation area 10 through vent holes (grills) 12a opened on the floor 12 of the device installation area 10. The cold air thus cools the computers in each of the racks 11.

In the computer room described above, it is desired to reduce the air conditioning energy of the air conditioners 19. For this reason, the airflow rates or the like of the air conditioners 19 are preferably controlled in real time in accordance with a temperature distribution acquired by providing a plurality of temperature measurement points in the device installation area 10 and the free access floor 15 and always monitoring the temperature at each of the points.

As a multi-point temperature measurement method of measuring the temperature in real time in the manner described above, there is a method of measuring the temperature of an optical fiber itself at a plurality of points from a change in the intensity of Raman scattered light occurring when an infrared laser pulse enters the optical fiber.

Figure 2:
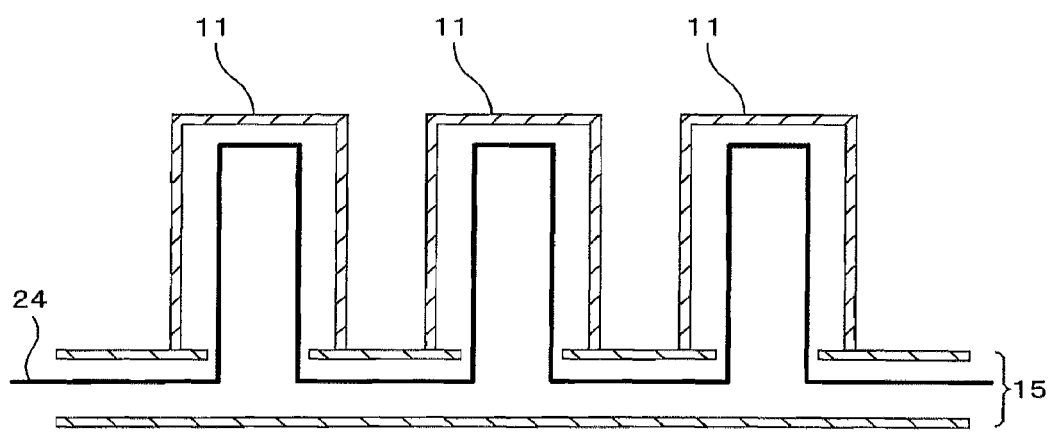
FIG. 2 is a cross-sectional view illustrating an installation example of an optical fiber.

FIG. 2 is a cross-sectional view illustrating an installation example of the optical fiber.

As illustrated in FIG. 2, an optical fiber 24 is introduced into the server racks 11 and the vicinity thereof from the free access floor 15 which is always kept at an almost constant temperature by the cold air. The optical fiber 24 is installed in the server racks 11 and in the vicinity thereof so as to pass through the vicinity of an inlet port and the vicinity of an exhaust port of each of the racks 11, which are the points where it is desired to measure the temperature in particular.

Figure 3:
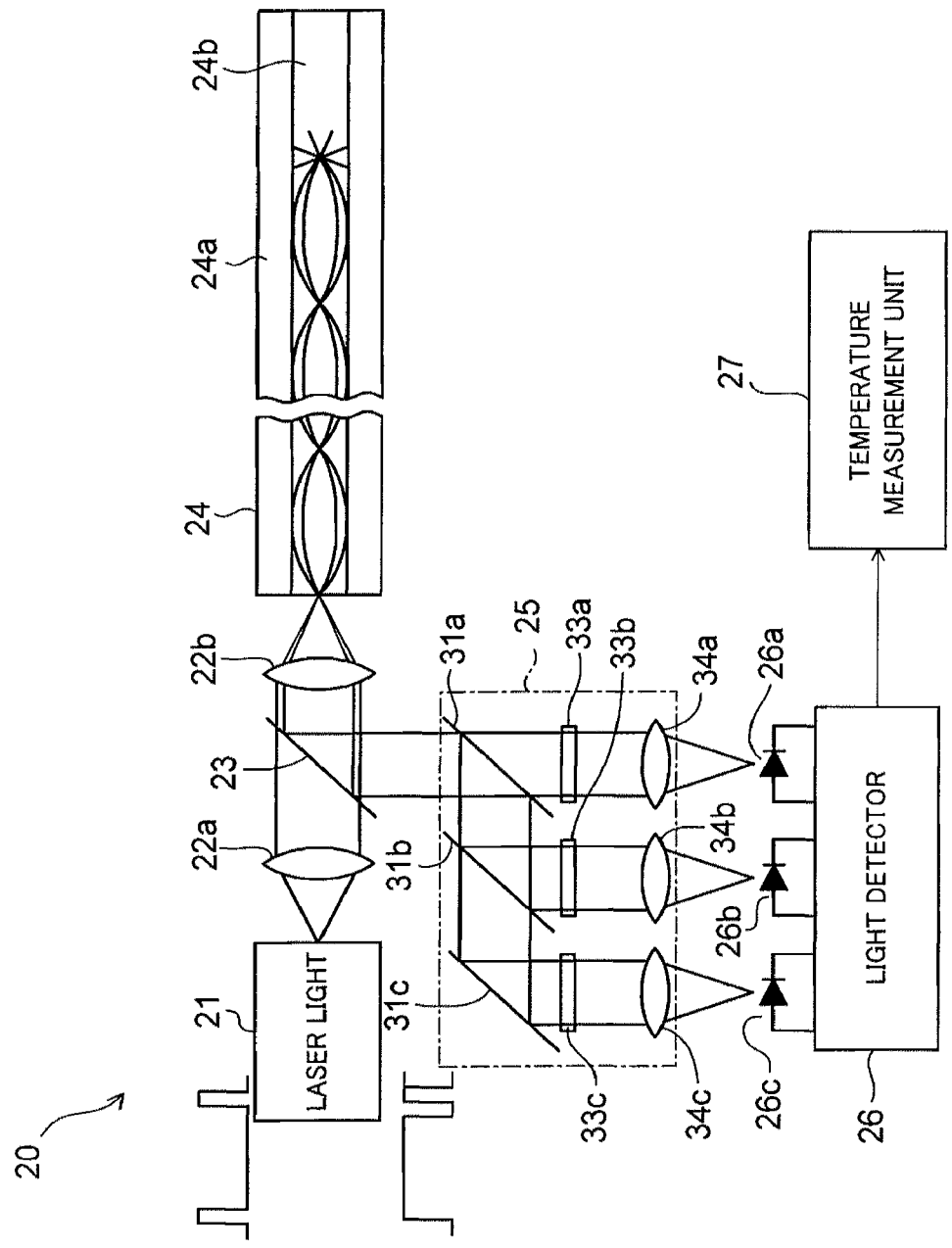
FIG. 3 is a schematic diagram illustrating a configuration of a temperature measurement system according to the present embodiment.
Figure 4:
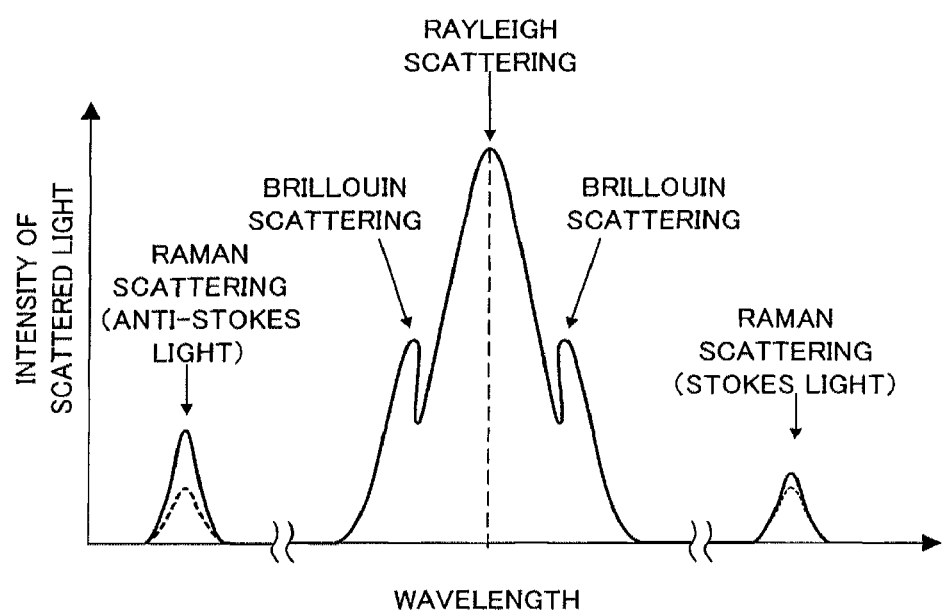
FIG. 4 is a diagram illustrating a spectrum of backscattered light in the optical fiber.

FIG. 3 is a schematic diagram illustrating a configuration of a temperature measurement system 20 using the optical fiber 24. In addition, FIG. 4 is a diagram illustrating a spectrum of backscattered light in the optical fiber 24.

As illustrated in FIG. 3, the temperature measurement system 20 includes a laser light source 21, lenses 22a and 22b, a beam splitter 23, the optical fiber 24, a wavelength separator 25, an light detector 26 and a temperature measurement unit 27.

Laser light with a predetermined pulse width is outputted from the laser light source 21 in a constant cycle. The laser light passes through the lens 22a, the beam splitter 23 and the lens 22b and then enters the optical fiber 24 through an end portion of the optical fiber 24 on a light source side. Note that, in FIG. 2, reference numeral 24a denotes the clad of the optical fiber 24 and reference numeral 24b denotes the core of the optical fiber 24.

The incident light in the optical fiber 24 is partially backscattered by the molecules of a material of the optical fiber 24. As illustrated in FIG. 4, the back scattered light includes Rayleigh scattered light, Brillouin scattered light and Raman scattered light. The Rayleigh scattered light is light having the same wavelength as that of the incident light. The Brillouin scattered light and the Raman scattered light are light having a wavelength shifted from the incident wavelength.

The Raman scattered light includes Stokes light shifted to a longer wavelength side than the incident light, and anti-Stokes light shifted to a shorter wavelength side than the incident light. The shifted amount of each of the Stokes light and the anti-Stokes light is normally about 50 nm although it depends on the wavelength of the laser light and the material of the optical fiber 24. In addition, the amount of change in the Stokes light by the temperature is small while the amount of change in the anti-Stokes light by the temperature is large. To put it more specifically, it may be stated that the Stokes light has a small temperature dependency while the anti-Stokes light has a large temperature dependency.

The aforementioned backscattered light returns through the optical fiber 24 and is emitted from the end portion thereof on the light source side as illustrated in FIG. 3. Then, the backscattered light passes through the lens 22b and is reflected by the beam splitter 23 and then enters the wavelength separator 25.

The wavelength separator 25 includes beam splitters 31a, 31b and 31c each configured to allow light to pass through the splitter or to reflect the light depending on the wavelength and also includes optical filters 33a, 33b and 33c each configured to allow light having a specific wavelength to pass through the filter. Moreover, the wavelength separator 25 includes condenser lenses 34a, 34b and 34c configured to condense the light beams passed through the optical filters 33a, 33b and 33c on light receiving portions 26a, 26b and 26c of the light detector 26, respectively.

The incident light in the wavelength separator 25 is separated into the Rayleigh scattered light, the Stokes light and the anti-Stokes light by the beam splitters 31a, 31b and 31c and the optical filters 33a, 33b and 33c and then inputted to the light receiving portions 26a, 26b and 26c of the light detector 26. As a result, signals in accordance with the intensities of the Rayleigh scattered light, the Stokes light and the anti-Stokes light are outputted from the light receiving portions 26a, 26b and 26c, respectively.

Then, the temperature measurement unit 27 such as a personal computer or the like acquires a measured temperature distribution along the installation path of the optical fiber 24 on the basis of the aforementioned signals outputted from the light detector 26 and corrects the measured temperature distribution in a manner to be described later.

Note that, the pulse width of the backscattered light inputted to the light detector 26 relates to the length of the optical fiber 24. For this reason, the intervals of the laser pulses outputted from the laser light source 21 are set in such a way that the backscattered light beams of the respective laser pulses would not overlap each other. If the power of the laser light is too high, the light may become a stimulated Raman scattering state. Thus, there arises a concern that correct measurement may not be performed in this case. For this reason, it is preferred that the power of the laser light source 21 be controlled such that the simulated Raman scattering state is prevented.

As described above, the Stokes light has a small temperature dependency while the anti-Stokes light has a large temperature dependency. Thus, the temperature at the position where the backscattering has occurred may be evaluated by the ratio between the Stokes light and the anti-Stokes light. The intensity ratio between the Stokes light and the anti-Stokes light may be expressed by Equation (1) below where an angular frequency of the incident light is $\omega_0$, an angular frequency of optical phonon in the optical fiber is $\omega_k$, Planck's constant is h, Boltzmann's constant is k and the temperature is T.

[Equation 1]

$$\frac{I_S^{anti\text{-}stokes}}{I_S^{stokes}} = \left(\frac{\omega_0 + \omega_k}{\omega_0 - \omega_k}\right)^4 \exp\left(\frac{-h\omega_k}{2\pi kT}\right) \quad (1)$$

To put it more specifically, if the intensity ratio between the Stokes light and the anti-Stokes light is found, the temperature at the position where the backscattering occurs may be calculated by Equation (1).

Here, the backscattered light generated in the optical fiber 24 attenuates while returning through the optical fiber 24. For this reason, in order to correctly evaluate the temperature at the position where the backscattering occurs, it may be necessary to take the attenuation of light into consideration.

Figure 5:
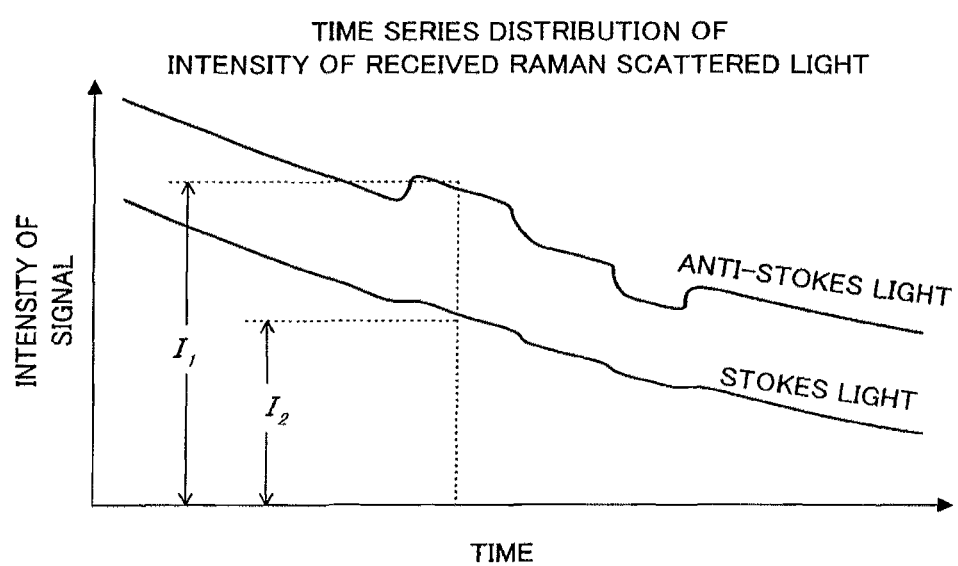
FIG. 5 is a diagram illustrating an example of a time series distribution of the intensity of Raman scattered light.

FIG. 5 is a diagram illustrating an example of a time series distribution of the intensity of Raman scattered light while the horizontal axis indicates time and the vertical axis indicates the intensities of the signals outputted from the light receiving portions of the light detector. The light detector 26 detects the Stokes light and the anti-Stokes light for a certain period immediately after a laser pulse enters the optical fiber 24. In a case where the temperature is uniform over the entire length of the optical fiber 24, the intensities of the signals decrease with time when the point where the laser pulse enters the optical fiber 24 is taken as a reference. In this case, the time indicated by the horizontal axis indicates the distance from the end portion of the optical fiber 24 on the light source side to the position where the backscattering occurs, and the decrease in the intensities of the signals with time indicates the attenuation of light because of the optical fiber 24.

In a case where the temperature is not uniform in the length direction of the optical fiber 24, e.g., in a case where a high temperature portion and a low temperature portion exist in the length direction, the intensities of the signals of the Stokes light and the anti-Stokes light do not attenuate uniformly, but peaks and troughs appear in the curves indicating the changes in the intensities of the signals with time as illustrated in FIG. 5. In FIG. 5, the intensity of the anti-Stokes light at a certain time t is set to $I_1$ and the intensity of the Stokes light at the certain time t is set to $I_2$.

Figure 6:
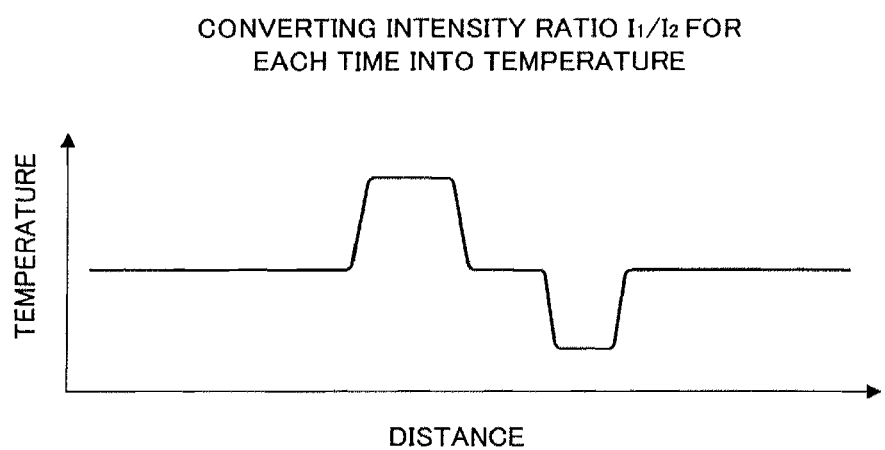
FIG. 6 is a diagram obtained by calculating an $I_1/I_2$ ratio on the basis of the time series distribution of the intensity of Raman scattered light in FIG. 5 for each time.

FIG. 6 is a diagram illustrating a result obtained by calculating the ratio of $I_1/I_2$ for each time on the basis of the time series distribution of the intensity of the Raman scattered light in FIG. 5 while converting the horizontal axis (time) in FIG. 5 into the distance and also converting the vertical axis (intensity of signal) into the temperature. As illustrated in FIG. 6, the temperature distribution of the optical fiber 24 in the length direction may be measured by calculating the intensity ratio between the anti-Stokes light and the Stokes light ($I_1/I_2$).

Note that, the intensity of the Raman scattered light (Stokes light and anti-Stokes light) in the position where the backscattering occurs changes due to a temperature, but the temperature dependency of the intensity of the Rayleigh scattered light is so small that it is negligible. Accordingly, it is preferred that the position where the backscattering occurs be identified from the intensity of the Rayleigh scattered light, and the intensities of the Stokes light and the anti-Stokes light detected by the light detector be corrected in accordance with the position.

Next, a problem with the temperature measurement system 20 using the optical fiber of this kind is considered.

Figure 7:
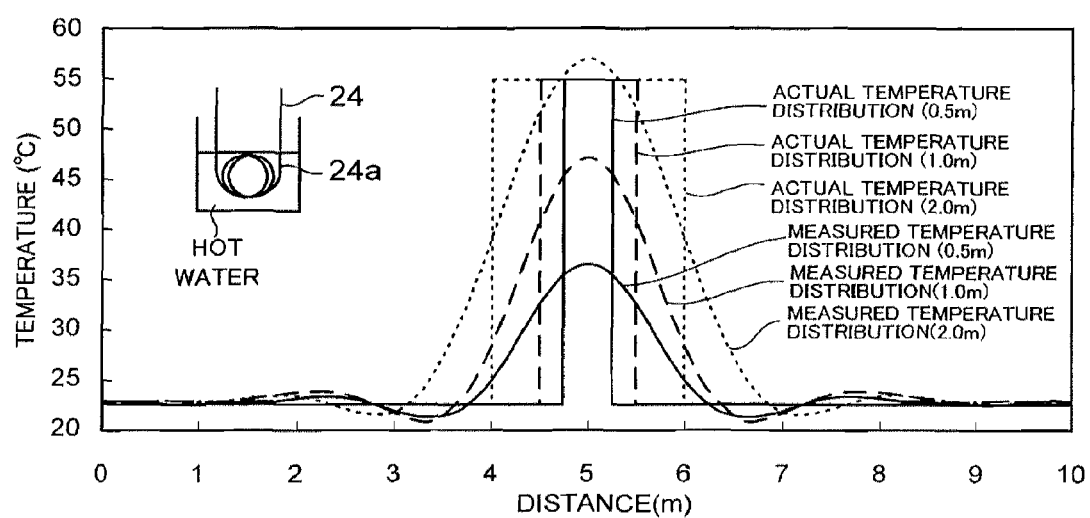
FIG. 7 is a diagram illustrating measured temperature distributions acquired by using the temperature measurement system according to the present embodiment.

FIG. 7 is a diagram illustrating measured temperature distributions acquired by using the temperature measurement system 20.

In this example, an actual temperature distribution of step type which rises from room temperature to a temperature of 55° C. is given by immersing a predetermined portion 24a of the optical fiber 24 in hot water of 55° C. Here, three types of the length of the predetermined portion 24a, namely, 0.5 m, 1.0 m and 2.0 m are prepared.

As illustrated in FIG. 7, each measured temperature distribution is in a dull shape resulting from applying a weighted moving average to the actual temperature distribution. Accordingly, it may be understood that the aforementioned temperature measurement system 20 has a low spatial frequency response, i.e., has a poor position resolution.

Figure 8:
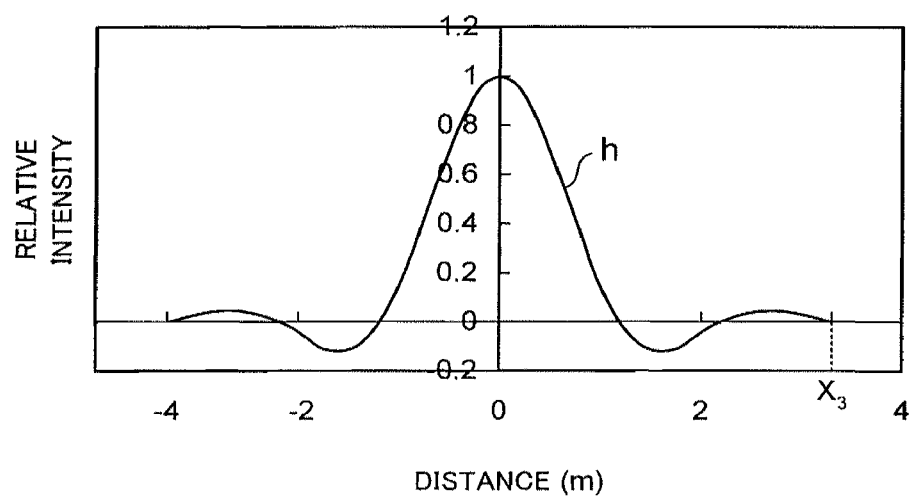
FIG. 8 illustrates a transfer function of the temperature measurement system, which is obtainable from an actual temperature distribution of step type.

FIG. 8 illustrates a transfer function h of the temperature measurement system 20, which is obtainable from the actual temperature distribution of step type of FIG. 7. In FIG. 8, the horizontal axis indicates the distance from the center of the heated area, and the vertical axis indicates the relative intensity of the temperature.

Figure 9:
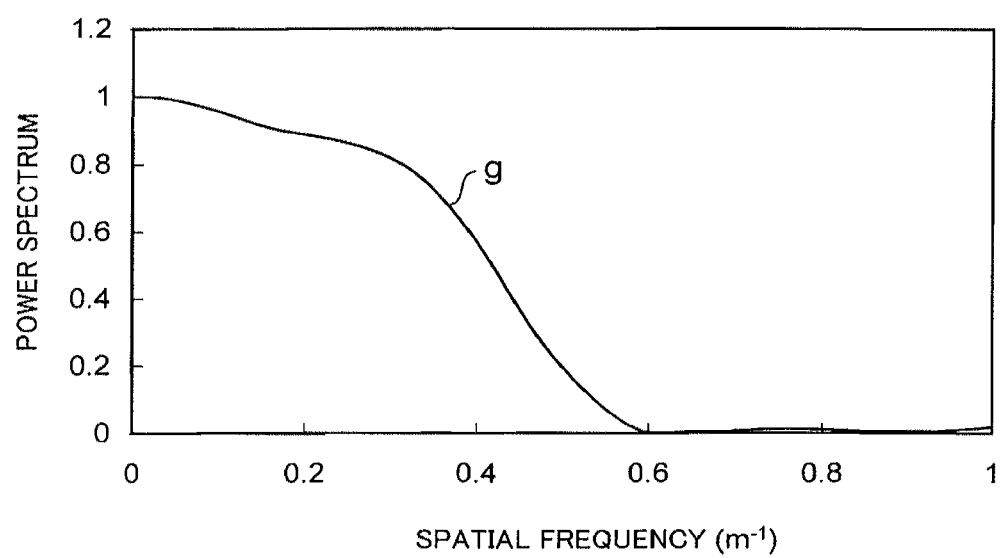
FIG. 9 is a diagram illustrating a function obtained by subjecting the transfer function to Fourier transformation.

If the transfer function h is subjected to Fourier transformation, a function g having a shape as illustrated in FIG. 9 may be obtained.

As illustrated in FIG. 9, the power spectrum of the function g has a small value in the region where the spatial frequency is equal to or more than approximately $0.6 \text{ m}^{-1}$. Accordingly, it may be understood that the aforementioned temperature measurement system 20 functions as a low pass filter that blocks the region where the spatial frequency is equal to or more than approximately $0.6 \text{ m}^{-1}$ and that a large portion of the frequency information in this region is thus lost.

In a case where the temperature measurement area is large scale such as a tunnel or blast furnace, the actual temperature changes in a long cycle along the installation path of the optical fiber, so that the temperature measurement system is not required to have a position resolution with high accuracy.

However, in a case where the actual temperature changes in a short cycle along the installation path of the optical fiber 24 as in the case of the inside of the server racks 11 and the vicinity thereof, the actual temperature distribution includes a high spatial frequency component. Thus, it is difficult to measure the temperature distribution with high accuracy in a situation where the low pass filter functions as in the case described above.

Figure 10:
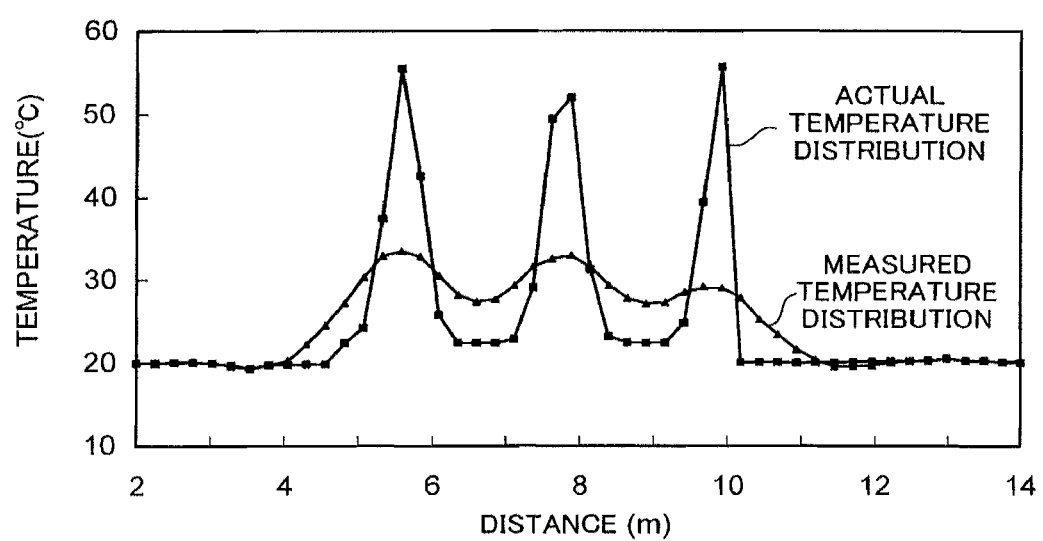
FIG. 10 is a diagram illustrating a measured temperature distribution acquired by measuring an actual temperature distribution in which the temperature changes in a relatively high spatial frequency, by use of the temperature measurement system according to the present embodiment.

FIG. 10 is a diagram illustrating a measured temperature distribution acquired by measuring an actual temperature distribution in which the temperature changes in a relatively high spatial frequency, by use of the temperature measurement system 20.

Note that, the actual temperature distribution in FIG. 10 is a measured value distribution of temperature by thermocouples.

As illustrated in FIG. 10, the measured temperature distribution has a shape obtained by taking a weighted moving average of the actual temperature distribution by the low pass filter.

Accordingly, it may be understood that, in order to acquire a highly accurate temperature distribution of a temperature measurement area, the measured temperature distribution acquired by the temperature measurement system 20 may not be used without modification, and that it is preferable to make the measured temperature distribution close to the actual temperature distribution by appropriately correcting the measured temperature distribution.

As a method of correcting the measured temperature distribution as described above, there is a method of causing an inverse filter which performs inverse operation of the low pass filter, i.e., a high pass filter to function on the measured temperature distribution.

Figure 11:
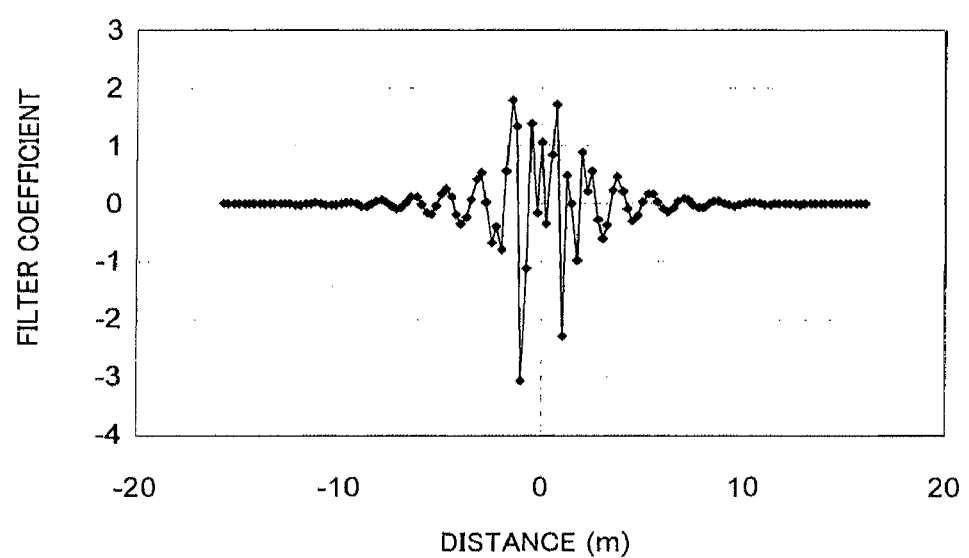
FIG. 11 is a diagram illustrating an example of an inverse filter used in correcting the measured temperature distribution.

FIG. 11 is a diagram illustrating the characteristics of such an inverse filter.

Note that, this inverse filter is designed based on an assumption that if there is noise in a region of a measured temperature distribution, where the spatial frequency is equal to or more than $0.6 \text{ m}^{-1}$, amplification of the noise is reduced.

Figure 12:
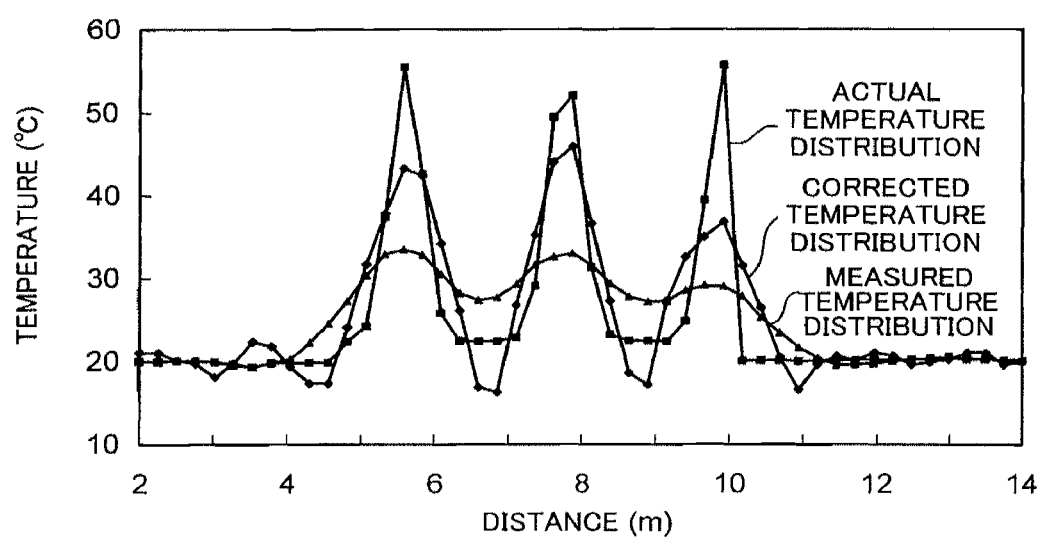
FIG. 12 is a diagram illustrating a corrected temperature distribution acquired by correcting the measured temperature distribution by causing the inverse filter to function on the measured temperature distribution.

FIG. 12 is a diagram illustrating a corrected temperature distribution acquired by correcting the measured temperature distribution of FIG. 10 by causing the inverse filter to function on the measured temperature distribution.

As illustrated in FIG. 12, sharper peaks appear in a case where corrections are made by the inverse filter than in a case where no corrections are made, but it is difficult to say that the actual temperature distribution is restored with high accuracy.

Meanwhile, if the power spectrum of the frequency component in the spatial frequency region which is lost due to the effect of the low pass filter is smaller than the power spectrum of the frequency component in the spatial frequency region which is included in the noise during the measurement, the frequency component may not be restored well by the inverse filter.

As described above, it is difficult to restore the spatial frequency component lost in the measured temperature distribution, by simply causing the inverse filter to function on the measured temperature distribution.

Thus, in the present embodiment, the measured temperature distribution is corrected in the following manner and thereby made closer to the actual temperature distribution.

Figure 13:
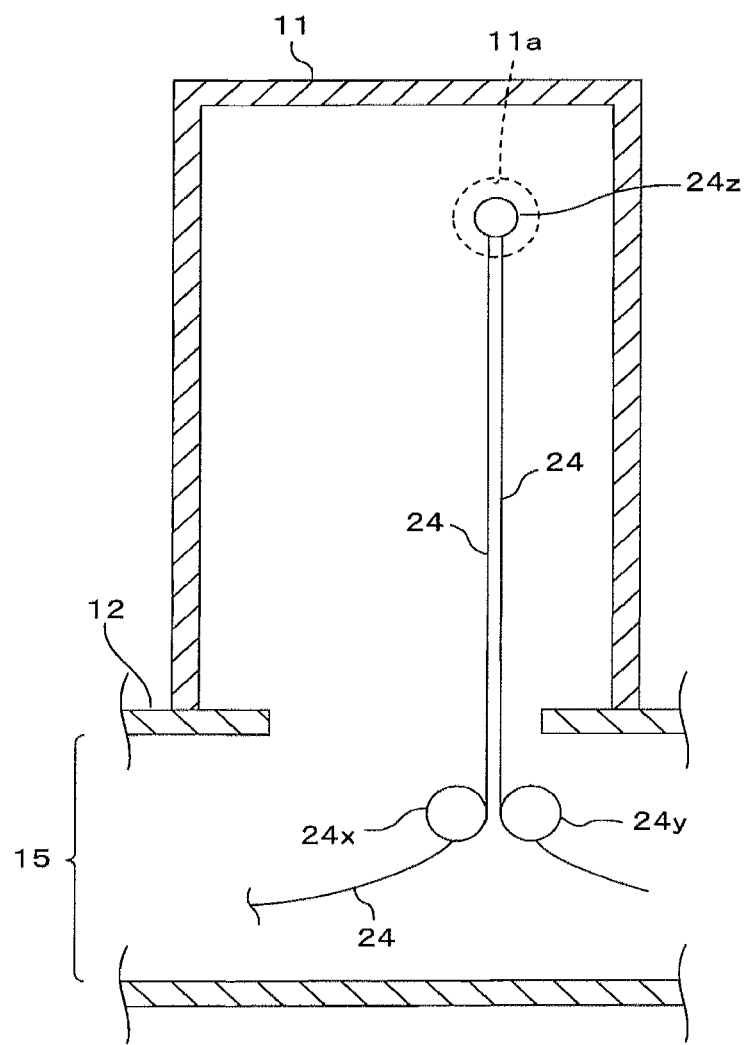
FIG. 13 is a cross-sectional view illustrating an installation example of the optical fiber, which is useful in correcting the measured temperature distribution in the present embodiment.

FIG. 13 is a cross-sectional view illustrating an installation example of the optical fiber 24, which is useful in correcting the measured temperature distribution.

As illustrated in FIG. 13, in this installation example, a first coiled portion 24*x* and a second coiled portion 24*y* of the optical fiber 24 are provided in the free access floor 15 where the temperature is kept constant by the cold air under the floor 12.

Then, a third coiled portion 24*z* of the optical fiber 24 is provided near an exhaust port 11*a* of the server rack 11. The exhaust port 11*a* is a portion through which the air heated by the computers generating heat is released. The third coiled portion 24*z* is thus heated by the hot air to a temperature higher than room temperature.

In addition, the optical fiber 24 is installed in such a way that the paths to and from the third coiled portion 24*z* would become the same in the server rack 11 illustrated in the drawing and in each of the other racks 11 and the vicinity thereof.

The diameter of each of the coiled portions 24*x*, 24*y* and 24*z* is not limited in particular, but the lower limit thereof is preferably set to be twice the minimum bend radius (approximately, 15 mm) allowed by the optical fiber 24.

Meanwhile, the upper limit of the diameter of each of the coiled portions 24*x*, 24*y* and 24*z* is preferably set to a diameter that allows the coiled portion to be within a region considered to have the same temperature spatially, e.g., 45 mm. In this configuration, the section coiled at each of the coiled portions 24*x*, 24*y* and 24*z* in the installation path of the optical fiber 24 may be considered to be kept at a constant temperature.

The sections of the optical fiber 24, which are coiled at the first coiled portion 24*x* and the second coiled portion 24*y*, may be considered to be kept at a temperature of the free access floor. In addition, the section of the optical fiber 24, which is coiled at the third coiled portion 24*z*, may be considered to be kept at a temperature of the vicinity of the exhaust port 11*a*.

In addition, the length of the section coiled at each of the first coiled portion 24*x* and the second coiled portion 24*y* in the installation path of the optical fiber 24 is not limited in particular, but the length of the section is determined in the following manner in this embodiment.

Figure 14:
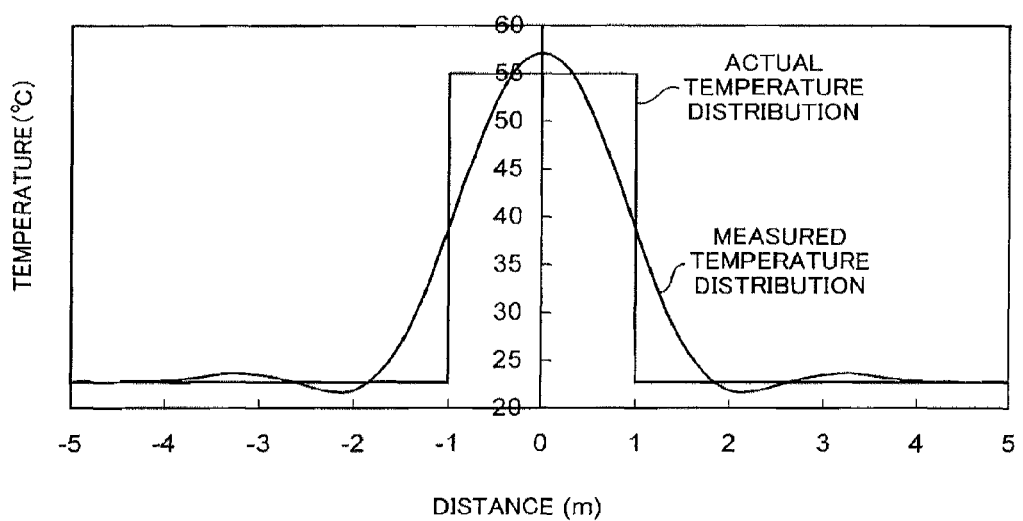
FIG. 14 is a diagram illustrating a measured temperature distribution acquired by the temperature measurement system according to the present embodiment in a case where a section of −1 m to 1 m around the center of a heated area of the optical fiber is heated to 55° C. while the temperature of the other sections is kept at room temperature (approximately 23° C.)

FIG. 14 is a diagram illustrating a measured temperature distribution acquired by the temperature measurement system 20 in a case where a section of −1 m to 1 m around the center of a heated area of the optical fiber 24 is heated to 55° C. while the temperature of the other sections is kept at room temperature (approximately 23° C.)

As illustrated in FIG. 14, the measured temperature distribution has spreading portions on the outer sides of the heated section of −1 m to 1 m, and the measured temperature of these portions does not become equal to room temperature which is the actual temperature. This is because if there is a temperature difference between two points in the installation path of the optical fiber, the result of the temperature measurement at each point is affected by the temperature difference.

The difference between the actual temperature and the measured temperature mentioned above becomes smaller as the temperature measurement point becomes apart from the region being heated.

With the transfer function h illustrated in FIG. 8, for example, the transfer function h practically converges to 0 near a third zero-point $X_3$ (=3.3 m) counted from the origin, and it is thus understood that the measured temperature near the zero point is not affected by the heat source at the origin.

Thus, let us consider that, the length of each of the sections respectively coiled at the coiled portions 24x and 24y in the installation path of the optical fiber 24 in FIG. 13 is set to a value equal to or more than the absolute value of the zero point $X_3$. In this case, even if a heat source exists in the outer side of the section in the installation path, a temperature measurement point corresponding to the actual temperature at each of the coiled portions 24x and 24y, which is not affected by the heat source, exists in the section.

Figure 15:
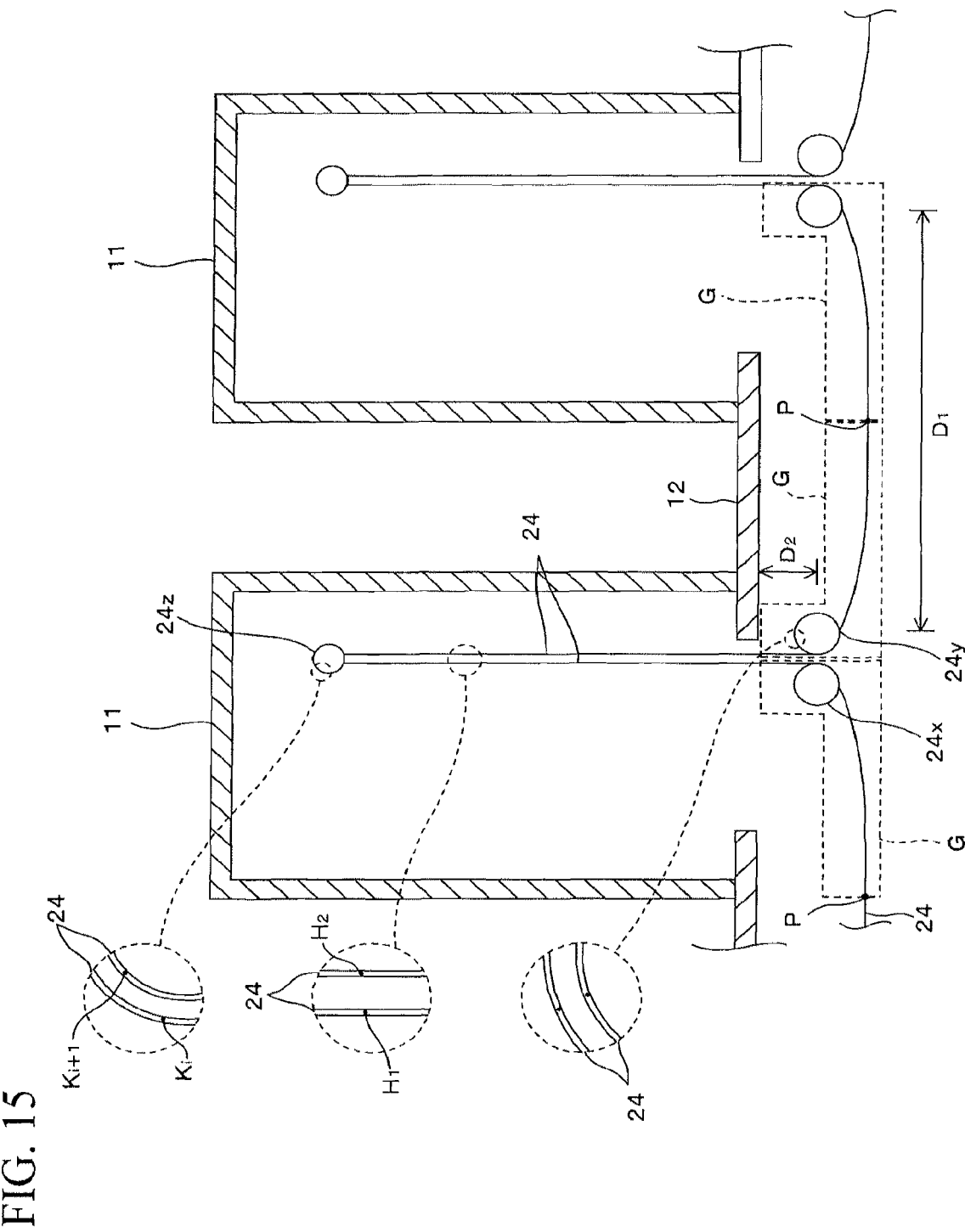
FIG. 15 is a schematic diagram illustrating an installation length of the optical fiber in consideration of the influence from a heat source in the present embodiment.

FIG. 15 is a schematic diagram illustrating an installation length of the optical fiber 24 in consideration of the influence from such a heat source.

In the example illustrated in FIG. 15, the length of the optical fiber 24 between adjacent server racks 11 is set to $D_1$, and the length of the optical fiber 24 from each of the coiled portions 24x and 24y to the entrance of the region above the floor 12, which is a high temperature portion as compared to the free access floor 15, is set to $D_2$.

In this case, the heat source is the computers in each of the server racks 11. In addition, a section G of the installation path of the optical fiber 24 in the free access floor 15 may be considered to be kept at a constant temperature by the cold air.

Note that, in this example, the section G is allocated to each of the coiled portions 24x and 24y, and the starting point of the section G is set to the floor 12, and the end point is set to a center point P of the adjacent racks 11.

A length L of the optical fiber 24 in the section G is $D_1/2+D_2+D_3$ when the length of the optical fiber 24 of the portion coiled at the coiled portions 24x and 24y is set to $D_3$. If this length L is set to a length equal to or more than the absolute value of the zero point $X_3$ of the aforementioned transfer function h, a temperature measurement point not affected by heat of the computers in the server rack 11, e.g., the center point P, exists in the section G.

Accordingly, when a plurality of temperature measurement points exist in the section G, it may be possible to estimate that the temperature at one of the measurement points, e.g., at the center point P and the temperatures of the remaining measurement points in the section G are the same.

As described later, the measured temperature distribution is corrected by use of the sameness of the measured temperatures in the section G described above in the present embodiment.

Each of the lengths $D_1$, $D_2$ and $D_3$ is not limited in particular as long as the length L of the optical fiber 24 in the section G becomes equal to or more than the absolute value (3.3 m) of the zero point $X_3$ of the transfer function h. In this example, the length L is set to 3.3 m by setting $D_1$, $D_2$ and $D_3$ to 1.0 m, 0.5 m and 2.3 m, respectively. Thus, the length L is set equal to or more than the absolute value (3.3 m) of the zero point $X_3$ of the transfer function h.

The installation example of the optical fiber 24 illustrated in FIG. 15 has the following characteristics in addition to the aforementioned sameness of the measured temperatures in the section G.

In the server rack 11 and the vicinity thereof, for example, the optical fiber 24 is installed in such a way that the paths to and from the third coiled portion 24z would become the same. Thus, overlapping points $H_1$ and $H_2$ of the optical fiber 24, which are considered to have the same temperature, exist in the paths.

Accordingly, for the correction of the measured temperature distribution, a condition that the correction temperatures for the overlapping points $H_1$ and $H_2$ are the same may be added.

For the same reason, any points of the optical fiber 24 in the third coiled portion 24z may be also considered to be overlapping points $K_i$ having substantially the same temperature. Thus, a condition that the correction temperatures for the overlapping points $K_i$ are the same may be added.

Hereinafter, a temperature measurement method by the temperature measurement system 20 using the aforementioned characteristics will be described.

The temperature measurement area of the temperature measurement system 20 is the device installation area 10 and the free access floor 15 with a focus on the temperature measurement in the areas in the server racks 11 and the vicinity thereof in particular.

Figure 16:
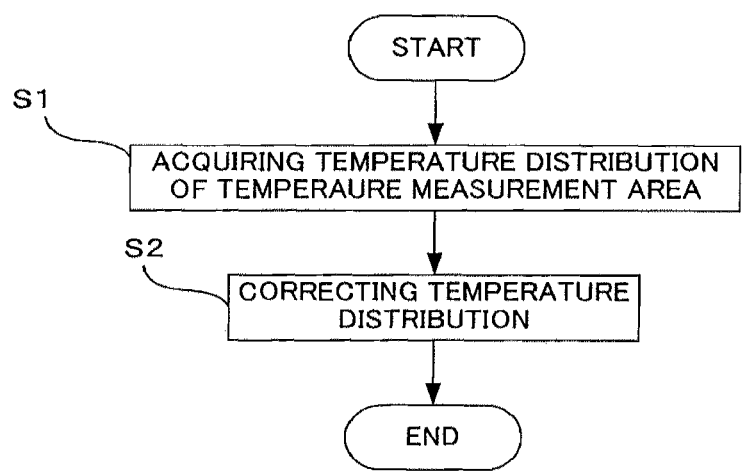
FIG. 16 is a flowchart illustrating a temperature measurement method according to the present embodiment.

FIG. 16 is a flowchart illustrating a temperature measurement method according to the present embodiment. The steps in this flowchart are performed in the already described temperature measurement unit 27.

Figure 17:
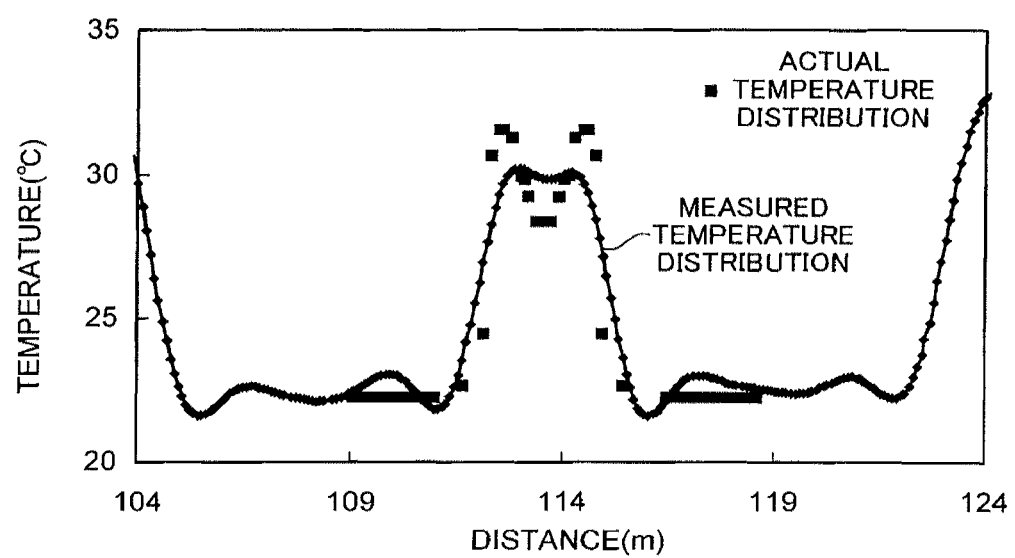
FIG. 17 is a diagram illustrating a measured temperature distribution acquired by the temperature measurement system according to the present embodiment.

In step S1 first, a measured temperature distribution of a temperature of the temperature measurement area along the installation path of the optical fiber 24 as illustrated in FIG. 17 is acquired by use of the temperature measurement system 20.

The horizontal axis in FIG. 17 indicates the distance from the end portion of the optical fiber 24, and the vertical axis indicates the temperature measured by the temperature measurement system 20.

In this example, the temperature is measured at a plurality of temperature measurement points of the optical fiber 24, and the intervals between the temperature measurement points are each set to 0.1 m. Furthermore, thermocouples for measuring the actual temperature are also provided at some of the temperature measurement points.

As illustrated in FIG. 17, the measured temperature distribution acquired by the temperature measurement system 20 differs from the actual temperature distribution acquired by the thermocouples.

Thus, in step S2 next, the measured temperature distribution is corrected in the following manner and thereby made closer to the actual temperature distribution.

First, the measured temperature distribution is expressed by Equation (2) below.

[Equation 2]

$$y=\{y_k\}_{k=0}^{k=\infty} \quad (2)$$

Here, the suffix k in the component $y_k$ represents the measurement point along the installation path of the optical fiber and the component $y_k$ indicates a value obtained by subtracting the temperature measurement value in the region where there is no change in the temperature (temperature value $T_{AB}$ in the center point P in the example cited in FIG. 15) from the temperature measurement value at the measurement point k.

Moreover, the actual temperature distribution is expressed by the following Equation (3).

[Equation 3]

$$x=\{x_i\}_{i=0}^{i=\infty} \quad (3)$$

As in the case of Equation (2), the suffix i in the component $x_i$ represents the measurement point and the component $x_i$ indicates a value obtained by subtracting the temperature measurement value in the region where there is no change in the temperature (temperature value $T_{AB}$ in the center point P in the example cited in FIG. 15) from the actual temperature at the measurement point i.

Here, the measured temperature distribution y may be expressed by Equation (4) below as a convolution of the actual temperature distribution x and the transfer function h.

[Equation 4]

$$y_k = \sum_{i=0}^{\infty} h_{k-i} x_i \quad (4)$$

Here, the range of i is a range that satisfies the condition that, k−i, which is the suffix, is equal to or more than 0.

Meanwhile, the equation may be expressed for each component by Equation (5).

[Equation 5]

$$\left.\begin{array}{l}y_0 = h_0 x_0 \\ y_1 = h_0 x_1 + h_1 x_0 \\ y_2 = h_0 x_2 + h_1 x_1 + h_2 x_0\end{array}\right\} \quad (5)$$

According to Equation (5), each component $h_{i-j}$ of the transfer function may be calculated by use of a least squares method or the like while Equation (5) is viewed as simultaneous equations of $h_j$.

As the actual temperature distribution x and the measured temperature distribution y for finding each component $h_{i-j}$ of the transfer function, the actual temperature distribution of step type as illustrated in FIG. 14 and a measured temperature distribution corresponding to this may be used, for example.

Note that, the transfer function h changes in accordance with the distance from the light source because the optical fiber 24 has group delay characteristics. For this reason, the transfer function h may not be defined uniquely over the entire length of the optical fiber 24. However, for a short section of the optical fiber 24, the transfer function h may be defined uniquely in this section with an assumption that the loss or delay of the optical signal in the optical fiber 24 is uniform.

Moreover, the transfer function h differs in accordance with not only the distance from the light source but also the material of the optical fiber 24, the pulse waveform of the incident laser, and the pulse response characteristic of the light detector 26. Accordingly, in order to find each component $h_{i-j}$ of the transfer function, each component $h_{i-j}$ is preferably found in accordance with the same conditions as those used in actually measuring the temperature.

Here, when Equation (4) is considered with focus on the region where there is a change in the temperature, the regions therearound are the regions where there is no change in the temperature, and the components $x_i$ and $y_k$ thereof are 0, so that the components do not have to be used in the calculation and have no meaning. In this respect, a column vector is expressed by the following Equation (6), the column vector collecting components excluding all components which are 0 and are in the regions around the focus region where there is a change in the temperature from the components of Equation (3).

[Equation 6]

$$x=(x_0,x_1,x_2,\ldots,x_n)^t \quad (6)$$

Likewise, in the case of the measured temperature distribution, the components of the regions where there is no change in the temperature are 0, so that the components do not have to be used in the calculation and have no meaning. Hence, a column vector is expressed by the following Equation (7), the column vector collecting components excluding all components which are 0 and are in the regions around the focus region where there is a change in the temperature from the components of Equation (2).

[Equation 7]

$$y=(y_0,y_1,y_2,\ldots,y_m)^t \quad (7)$$

The numbers of the components of the column vectors of Equations (6) and (7) are n+1 and m+1, respectively. However, for m and n, m is larger than n. This is because the measured temperature distribution spreads wider in the horizontal direction than the actual temperature distribution as illustrated in FIG. 14, and hence the measured temperature distribution has a larger number of components which are not 0.

As in the cases of Equations (6) and (7), in a case where the actual temperature distribution x and the measured temperature distribution y are set to the finite dimensional column vectors, respectively, and Equation (5) is expressed in the form of Equation (8), [H] is formed on the basis of the transfer function h and has a finite number of components (m+1)×(n+1). [H], which is formed in this manner, is called a matrix representation of the transfer function.

[Equation 8]

$$y=[H]x \quad (8)$$

Here, the dimension of each of the column vectors x and y of Equation (8) is a finite dimension as in the case of Equations (6) and (7).

In Equation (8), the components $y_i$ of y correspond to m+1 values obtained by temperature measurement, and [H] may be considered as a coefficient matrix of (m+1)×(n+1) of simultaneous equations. Since the relationship m>n holds true, this simultaneous equation may not be uniquely solved for x.

In this respect, a square error e in Equation (9) below is considered in the present embodiment.

[Equation 9]

$$e=\|y-[H]X\|^2=(y-[H]X)^t(y-[H]X) \quad (9)$$

Note that, the column vector X in Equation (9) is an n-dimensional vector having the components in Equation (10) below as in the case of the actual temperature distribution.

[Equation 10]

$$X=(X_0,X_1,X_2,\ldots,X_n)^t$$

The distribution X that makes e in Equation (9) small approximately satisfies Equation (8) as well. Then, the smaller the e in Equation (9), the higher the accuracy of approximation, and the distribution X becomes closer to the actual temperature distribution x. Hereinafter, the distribution X is called a corrected temperature distribution of the measured temperature distribution y. Accordingly, Equation (9) may be said to be an equation for calculating the square error e between a convolution of the transfer function h of the optical fiber 24 along the installation path and the corrected temperature distribution X, and the measured temperature distribution y.

In order to find the corrected temperature distribution X that makes the square error e as small as possible, a gradient vector ∂e/∂X of the square error e is calculated from Equation (9) by Equation (11) below.

[Equation 11]

$$\frac{\partial e}{\partial X} = \begin{bmatrix} \frac{\partial e}{\partial X_1} \\ \frac{\partial e}{\partial X_2} \\ \vdots \\ \frac{\partial e}{\partial X_n} \end{bmatrix} \quad (11)$$

$$= \frac{\partial}{\partial X} \|y - [H]X\|^2$$

$$= -2[H]^t(y - [H]X)$$

$$= -2([H]^t y - [H]^t[H]X)$$

Determination of each component $X_i$ of X in order that this gradient vector ∂e/∂X is 0 corresponds to the least square method.

Note that, if the diagonal component of $[H]^t[H]$ in Equation (11) is slightly increased in consideration of noise during measurement, amplification of the high frequency component of the noise may be suppressed, and thus, the margin tolerance may be increased. The correction by the aforementioned inverse filter (refer to FIG. 12) corresponds to the correction calculated by the least square method.

Here, the gradient vector ∂e/∂X indicates the direction in which the square error e increases. Thus, if a movement is made in the direction of the reverse sign, −∂e/∂X, the square error e decreases.

In this respect, the correction is made on X sequentially as represented by Equation (12) below in this embodiment.

[Equation 12]

$$X^{(k+1)} = X^{(k)} - \alpha \frac{\partial e}{\partial X}\bigg|_{X=X^{(k)}} \quad (12)$$

Here, k indicates the number of repetitions of correction, and $X^{(k)}$ is the corrected temperature distribution in the case where the correction is made k times. This $X^{(k)}$ may be displayed in components as in Equation (13) below.

[Equation 13]

$$X^{(k)} = (X_0^{(k)}, X_1^{(k)}, \ldots, X_n^{(k)})^t \quad (13)$$

Then, α is a positive correction coefficient number with which Equation (12) converges, and may be selected within a range of 0.5 to 1, empirically. Calculation is performed where α is set to 0.5 below.

In addition, $X^{(0)}$, which is the initial value, is a zero vector, and Equation (11) using one in which the diagonal component of $[H]^t[H]$ is slightly increased is used in the calculation of ∂e/∂X in Equation (12).

In the present embodiment, repetitive calculation is performed using Equation (12), and thus, calculation of the corrected temperature distribution $X^{(k+1)}$ which makes the square error e further smaller than that of $X^{(k)}$ is sequentially performed a plurality of times.

Here, as described with reference to FIG. 15, the temperature at the plurality of measurement points i in the section G in the installation path of the optical fiber 24 may be estimated to be the same as the temperature at the center point P.

In this respect, the component $X_i^{(k)}$ corresponding to the plurality of measurement points i included in the first and second coiled portions 24x and 24y in the section G is replaced with the measured temperature at the center point P for each time of correction calculation by Equation (12) in the present embodiment. As described when Equations (6) and (7) are defined, each component of the column vectors x, y, and X is a value obtained by subtracting the measured temperature $T_{AB}$ at the center point P from the actual value, the replaced value of each component $X_i^{(k)}$ becomes 0 ($=T_{AB}-T_{AB}$).

The temperature 0 ($=T_{AB}-T_{AB}$) found from the measured temperature $T_{AB}$ is a component value at the measurement point corresponding to the center point P among the plurality of components $y_i$ of the measured temperature distribution y and has the meaning as the common estimated temperature in the section G.

Note that, the common estimated temperature in the section G is not limited to the aforementioned temperature 0 ($=T_{AB}-T_{AB}$). An average value of the plurality of components $y_i$ of the measured temperature distribution y, which correspond to the plurality of measurement points i in regions included in each of the coiled portions 24x and 24y, where the actual temperature is measured may be set to the common estimated temperature among the measurement points, for example. In this case, the number of measurement points i corresponding to the regions included in each of the coiled portions 24x and 24y, where the actual temperature is measured may be increased by increasing the length $D_3$ of the optical fiber 24, which corresponds to the portion coiled at each of the coiled portions 24x and 24y, to a length longer than the aforementioned length, 2.3 m. Thus, the estimation accuracy of temperature is improved. Moreover, the increase in the length $D_3$ as described may make it possible to reduce the influence of the temperature of an adjacent server rack 11.

Moreover, as described with reference to FIG. 15, the overlapping points $H_1$ and $H_2$, which may be considered to have the same temperature, exist in the optical fiber 24 from the coiled portions 24x and 24y to the third coiled portion 24z. Accordingly, for these overlapping points, the components $X_{i1}^{(k)}$ and $X_{i2}^{(k)}$ of the corrected temperature distribution at the respective overlapping points $H_1$ and $H_2$ are replaced with an average value $X_{avg1}$ ($=(X_{i1}^{(k)}+X_{i2}^{(k)})/2$) of the corrected temperatures of the respective overlapping points $H_1$ and $H_2$ for each time of correction calculation by Equation (12). The corrected temperatures $X_{i1}^{(k)}$ and $X_{i2}^{(k)}$ are component values at the measurement points i1 and i2 corresponding to the respective overlapping points $H_1$ and $H_2$ among the plurality of components $X_i^{(k)}$ of the corrected temperature distribution $X^{(k)}$, and the average value $X_{avg1}$ of the component values has the meaning as the common estimated temperatures for the overlapping points $H_1$ and $H_2$.

Likewise, for also the plurality of overlapping points $K_i$ existing in the third coiled portion 24z, the components $X_i^{(k)}$ of the measured temperature distribution at the respective overlapping points $K_i$ are replaced with an average value $X_{avg2}$ of the corrected temperatures $X_i^{(k)}$ of the respective overlapping points $K_i$ for each time of correction calculation by Equation (12). As described above, the corrected temperatures $X_i^{(k)}$ are component values at the measurement points i corresponding to the respective overlapping points $K_1$ among the plurality of components $X_i^{(k)}$ of the corrected temperature distribution $X^{(k)}$, and the average value $X_{avg1}$ of the component values has the meaning as the common estimated temperatures for the overlapping points Ki.

For example, the intervals between the temperature measurement points of the optical fiber 24 are each set to 0.1 m in the present embodiment as described above. Thus, when the length of the portion of the optical fiber 24 which is coiled at the third coiled portion 24z is 0.5 m, for example, the number of overlapping points $K_i$ is five (=0.5 m/0.1 m). Thus, components $X_{i-2}^{(k)}$, $X_{i-1}^{(k)}$, $X_i^{(k)}$, $X_{i+1}^{(k)}$ and $X_{i+2}^{(k)}$ of the corrected temperature distribution at the overlapping points $K_{i-2}$, $K_{i-1}$, $K_i$, $K_{i+1}$ and $K_{i+2}$ are replaced with the average value $X_{avg2}$ (=$(X_{i-2}^{(k)}+X_{i-1}^{(k)}+X_i^{(k)}+X_{i+1}^{(k)}+X_{i+2}^{(k)})/5$) of the corrected temperatures $X_{i-2}^{(k)}$, $X_{i-1}^{(k)}$, $X_i^{(k)}$, $X_{i+1}^{(k)}$ and $X_{i+2}^{(k)}$ at the respective points for each time of correction calculation.

Here, the plurality of measurement points i existing in each of the coiled portions 24x and 24y are considered to have the same temperature $T_{AB}$ as described above. As described when Equations (6) and (7) are defined, each component of the column vectors x, y, and X is a value obtained by subtracting $T_{AB}$ from the actual temperature value. Thus, in order to find the final corrected temperature distribution $T_{iomp\_i}$, the temperature $T_{AB}$ may be added again as in Equation (14) below after end of calculation of a required number of repetitions (n times) for Equation (12).

[Equation 14]

$$T_{iomp\_i} = X_i^{(n)} + T_{AB} \quad (14)$$

In addition, an increase in the temperature of the first and second coiled portions 24x and 24y in the optical fiber 24 is prevented by the cold air, but the other portions of the optical fiber 24 exists on the floor 12 where the temperature is higher than the free access floor 15. Thus, the temperature of the other portions does not fall below the temperature of the coiled portions 24x and 24y.

The aforementioned condition is expressed by Equation (15) below.

[Equation 15]

$$X_i^{(k)} \geq 0 \quad (15)$$

Then, if there is a component that becomes $X_i^{(k)} < 0$ at k-th calculation by Equation (12), the component $X_i^{(k)}$ is set to 0, and thereafter, k+1-th calculation is performed.

As described, if the temperature measurement area includes a portion known to have a temperature equal to or higher than a predetermined temperature, calculation is preferably simplified by replacing the corrected temperature at the portion by use of Equation (12) with the predetermined temperature, when the corrected temperature at the portion becomes lower than the predetermined temperature.

In addition, on the other hand, if the temperature measurement area includes a portion known to have a temperature equal to or lower than a predetermined temperature, the corrected temperature at the portion by use of Equation (12) is preferably replaced with the predetermined temperature, when the corrected temperature of the portion becomes higher than the predetermined temperature.

In step S2, the correction calculation using Equation (12) is repeatedly performed in the manner described above, and the final corrected temperature distribution $T_{iomp\_i}$ is found from an index for the amount of decrease in the square error e, e.g., $X_i^{(n)}$ with which $e^{(n)} - e^{(n-1)}$ becomes equal to or less than a predetermined value. Note that, $e^{(n)}$ is the square error found from Equation (9) by use of $X^{(n)}$ obtained by making the correction by Equation (12) n times.

As described above, the primary steps of the temperature measurement method according to the present embodiment are completed.

With the temperature measurement method, the corrected temperature distribution $X_i^{(k)}$ at a specific point of the installation path of the optical fiber 24 is replaced with a predetermined value in each of the corrections using Equation (12).

Replacement with the measured temperature $0 = (T_{AB} - T_{AB})$ at the center point P is made for the section G, and replacement with the average value $X_{avg1}$ is made for the overlapping points $H_1$ and $H_2$, for example. In addition, replacement with the average value $X_{avg2}$ is made for the plurality of overlapping points $K_i$ existing in the third coiled portion 24z.

Next, the advantages obtainable from the aforementioned replacement are described.

Figure 18:
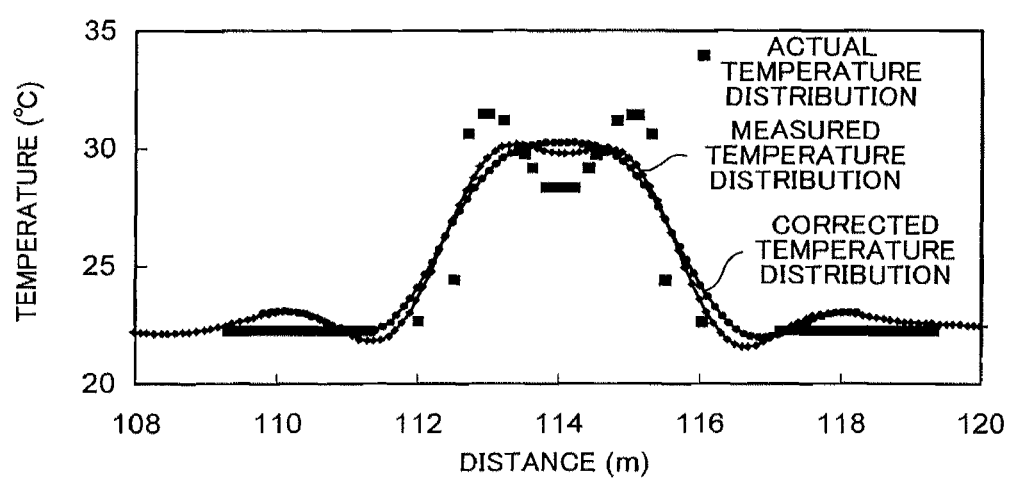
FIG. 18 is a diagram illustrating a corrected temperature distribution for a case where a correction is made once for the measured temperature distribution by the temperature measurement system according to the present embodiment.
Figure 19:
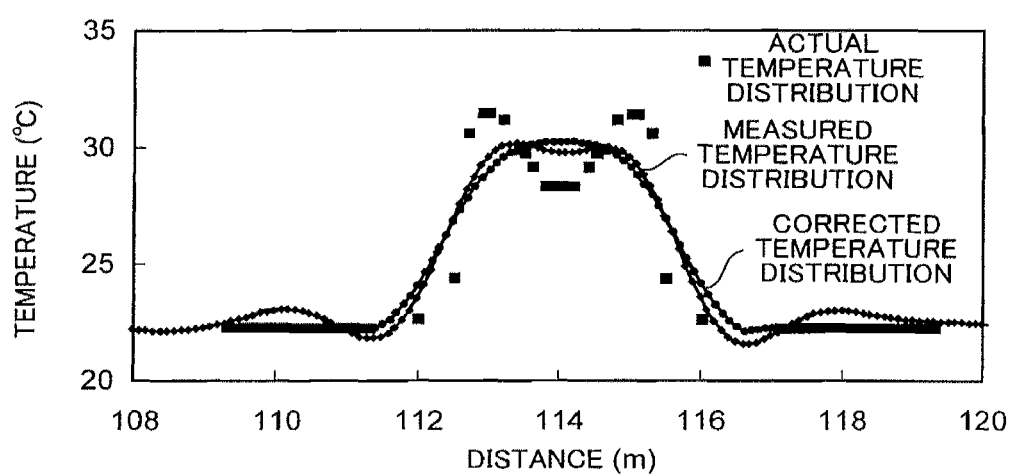
FIG. 19 is a diagram illustrating a corrected temperature distribution for a case where the temperature at a specific point is replaced after a correction is made once by the temperature measurement system according to the present embodiment.
Figure 20:
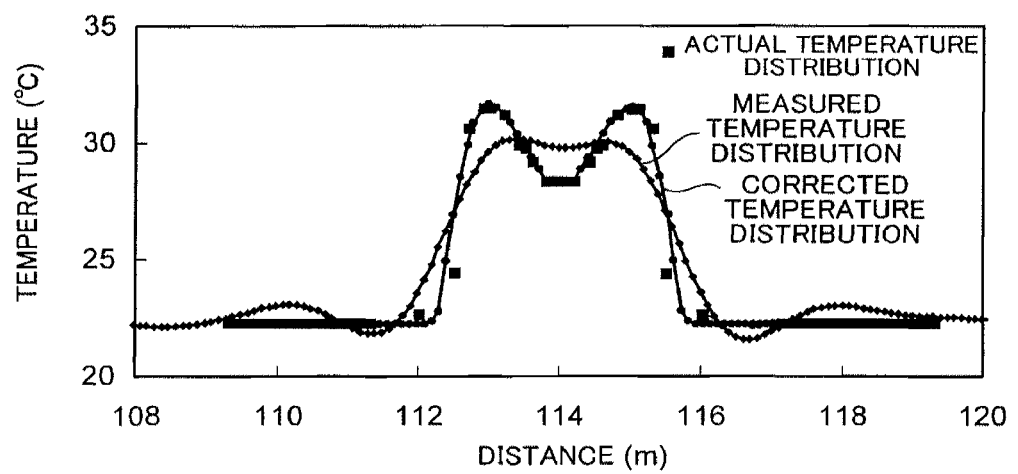
FIG. 20 is a diagram illustrating a corrected temperature distribution for a case where a correction is made 100 times for the measured temperature distribution by the temperature measurement system according to the present embodiment.

FIG. 18 to FIG. 20 are diagrams each illustrating a measured temperature distribution thus corrected, and the horizontal axis indicates the distance from the end portion of the optical fiber 24 and the vertical axis indicates the temperature.

FIG. 18 is a diagram for a case where the correction by Equation (12) is made once. As illustrated in FIG. 18, the difference between the actual temperature distribution and the corrected temperature distribution is not resolved by the correction made once.

FIG. 19 illustrates a diagram for a case where the aforementioned replacement is made for each region, section G, and the points $H_1$, $H_2$ and $K_i$ after the first correction. As illustrated in FIG. 19, the values of the temperature at the portions of the corrected temperature distribution, where the replacement is made, substantially become the same as those of the actual temperature distribution.

FIG. 20 is a diagram for a case where such correction calculation is repeated 100 times. As illustrated in FIG. 20, when such correction calculation is performed 100 times, the corrected temperature distribution substantially coincides with the actual temperature distribution.

Figure 21:
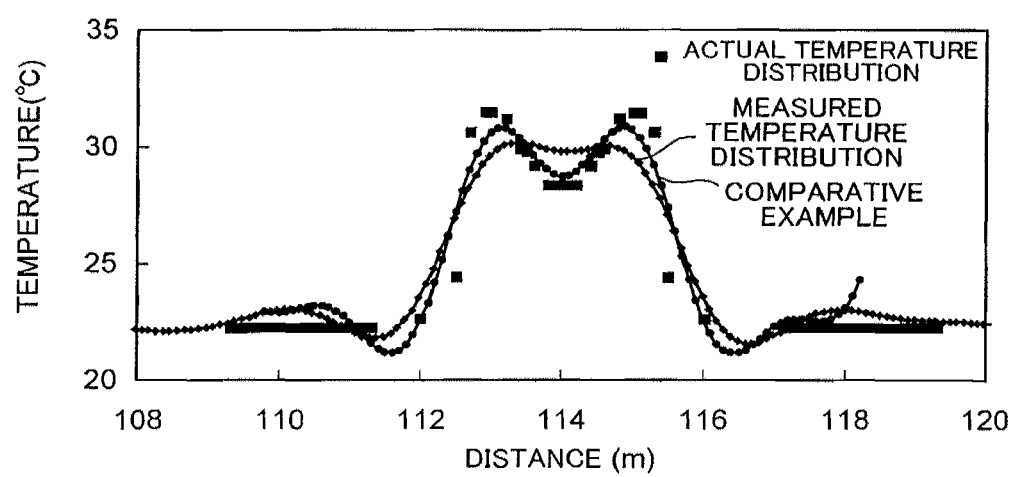
FIG. 21 is a diagram illustrating a correction result according to a comparative example.

FIG. 21 is a diagram illustrating a correction result according to a comparative example. This comparative example is different from the present embodiment in that the correction by Equation (12) is performed 100 times without replacing the corrected temperature distribution $X_i^{(k)}$ at the specific points of the installation path of the optical fiber 24 with the predetermined values. As illustrated in FIG. 21, it may be seen that the difference from the actual temperature distribution is not resolved in the comparative example.

As described, in the present embodiment, replacement of the corrected temperature distribution $X_i^{(k)}$ at the specific points of the installation path of the optical fiber 24 with the predetermined values for each time of correction calculation by Equation (12) may make it possible to acquire the corrected temperature distribution close to the actual temperature distribution.

Thus, even in a case where the actual temperature changes in a short cycle along the installation path of the optical fiber 24 as in the case of the server racks 11, temperature measurement may be performed with high accuracy.

Then, the airflow rates from the air conditioners 19 (refer to FIG. 1) are controlled by use of the temperature measurement result in real time to suppress the air conditioning energy, and in the meantime, the cooling state of the device installation area 10 and the like may be kept in an optimum state.

Hereinafter, Examples in each of which the temperature distribution in the server rack is measured by use of the present embodiment is described.

Example 1

Figure 22:
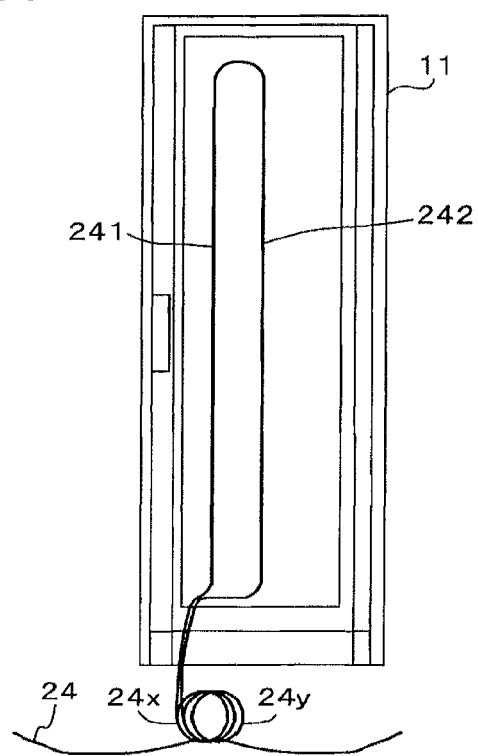
FIG. 22 is a schematic diagram illustrating an installation state of an optical fiber in Example 1.

As illustrated in FIG. 22, the optical fiber 24 is installed on an exhaust-side door of the server rack 11. To put it more specifically, the coiled portions 24x and 24y of the optical fiber 24 are disposed at the same position in the free access floor, and the optical fiber 24 is installed in such a way that the optical fiber 24 between the coiled portions 24x and 24y is drawn into the rack 11 so as to extend along the exhaust door from below to above and then to return to below. In FIG. 22, reference numeral 241 denotes the outward path of the optical fiber and reference numeral 242 denotes the return path of the optical fiber. For the purpose of comparison, a plurality of thermocouples are disposed along the optical fiber 24, and the temperature distribution of the rack 11 and the free access floor is measured by these thermocouples as well.

Figure 23:
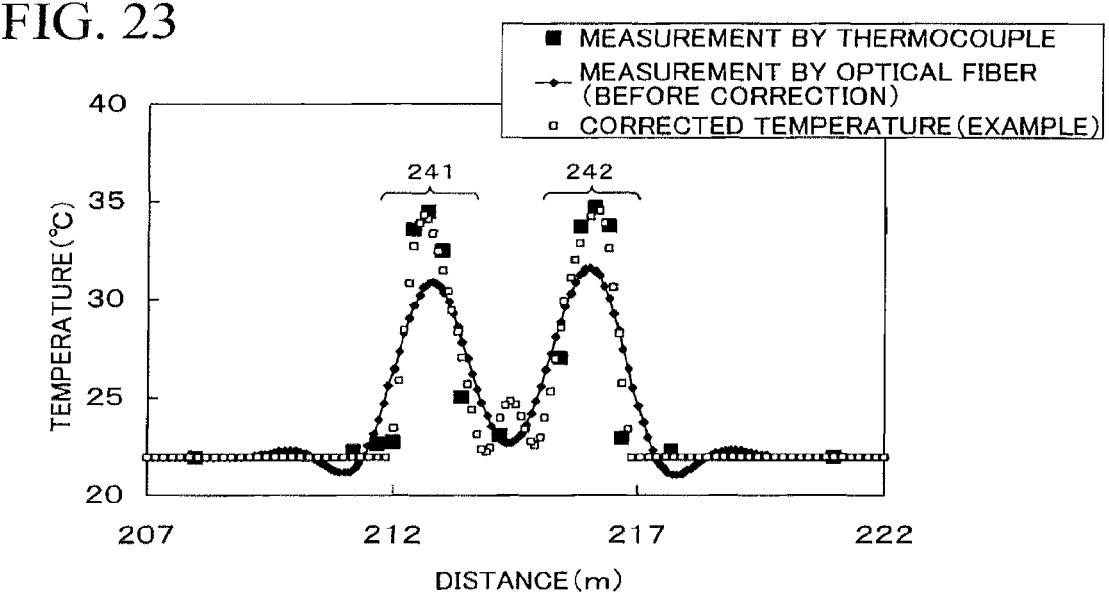
FIG. 23 is a diagram illustrating a temperature distribution measured by thermocouples, a temperature distribution measured by an optical fiber temperature measurement system (before correction) and a temperature distribution corrected by the present embodiment in Example 1.

FIG. 23 is a diagram illustrating a temperature distribution measured by the thermocouples, a temperature distribution measured by the optical fiber temperature measurement system 20 (before correction) and a temperature distribution corrected by the present embodiment, while the horizontal axis indicates the position of the optical fiber 24 in the length direction and the vertical axis indicates the temperature. Here, the correction using Equation (12) is repeated 100 times, and the temperatures of the measurement points of the regions corresponding to the coiled portions 24x and 24y are replaced in each of the corrections with the temperature of the measurement point corresponding to the center portion P in the section G of FIG. 15.

As illustrated in FIG. 23, the corrected temperature distribution almost coincides with the temperature distribution measured by the thermocouples. In addition, the difference in the temperature distribution between the outward path 241 and the return path 242 of the optical fiber is successfully recognized in the corrected temperature distribution.

Example 2

Figure 24:
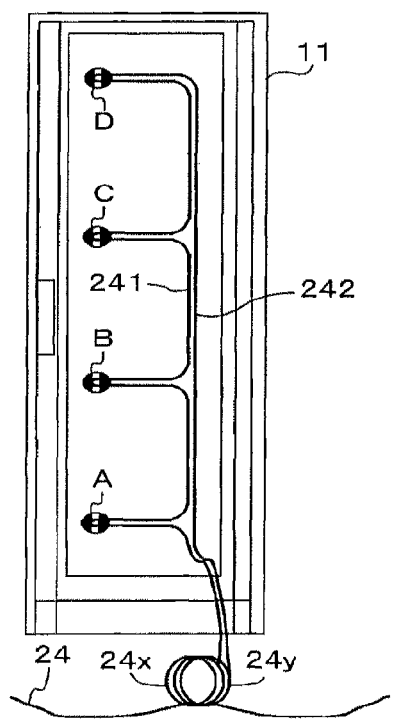
FIG. 24 is a schematic diagram illustrating an installation state of an optical fiber in Example 2.

As illustrated in FIG. 24, the optical fiber 24 is installed on an exhaust-side door of the server rack. To put it more specifically, the coiled portions 24x and 24y of the optical fiber 24 are disposed at the same position in the free access floor, and the optical fiber 24 is installed in such a way that the optical fiber 24 between the coiled portions 24x and 24y is drawn into the rack 11 so as to extend along the exhaust door from below to above and then to return to below. However, coiled portions A, B, C and D of the optical fiber are disposed in the outward path at positions corresponding to exhaust ports of four servers (not illustrated) installed in the rack. Meanwhile, the optical fiber of the return path is installed in such a way that the optical fiber passes through the same position as the optical fiber of the outward path except for the portions of the coiled portions A, B, C and D and the vicinities of the portions. Moreover, for the purpose of comparison, a plurality of thermocouples are disposed along the optical fiber 24, and the temperature distribution of the rack 11 and the free access floor is measured by these thermocouples as well.

Figure 25:
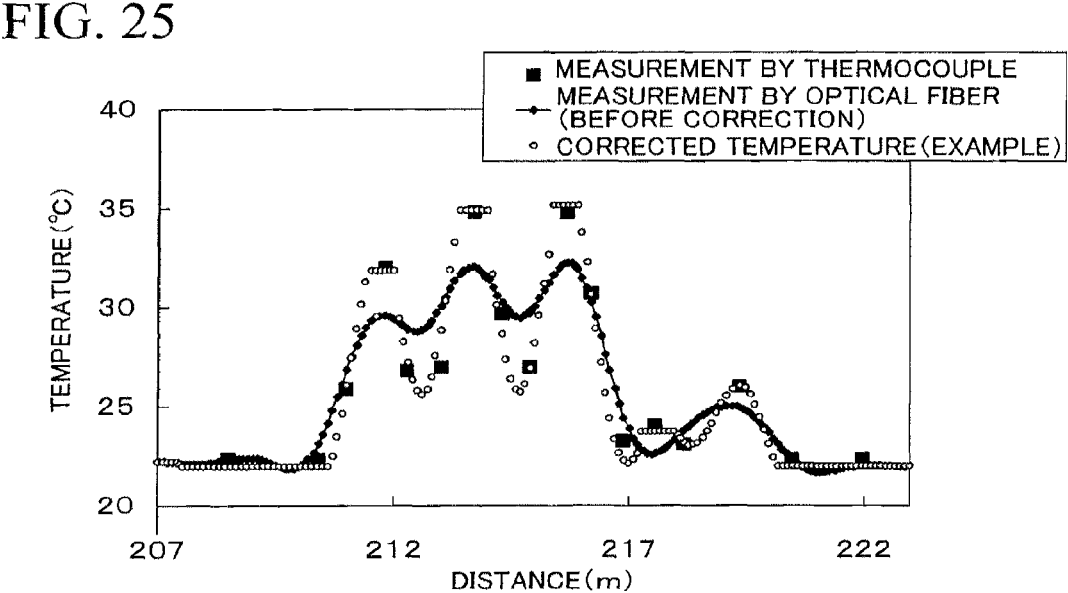
FIG. 25 is a diagram illustrating a temperature distribution measured by thermocouples, a temperature distribution measured by an optical fiber temperature measurement system (before correction) and a temperature distribution corrected by the present embodiment in Example 2.

FIG. 25 is a diagram illustrating a temperature distribution measured by the thermocouples, a temperature distribution measured by the optical fiber temperature measurement system 20 (before the correction) and a temperature distribution corrected by the present embodiment, while the horizontal axis indicates the position of the optical fiber 24 in the length direction and the vertical axis indicates the temperature. Here, the correction using Equation (12) is repeated 100 times, and the temperatures of the measurement points of the regions corresponding to the coiled portions 24x and 24y are replaced in each of the corrections with the temperature of the measurement point corresponding to the center portion P in the section G of FIG. 15. Meanwhile, in each of the corrections, the temperatures of the measurement points in the region corresponding to each of the coiled portions A, B, C and D are replaced with an average temperature in a corresponding one of the coiled portions A, B, C and D. In addition, in the portions where the outward path and the return path pass through the same position, the temperatures of these portions are replaced with an average temperature of the portions.

As illustrated in FIG. 25, the corrected temperature distribution almost coincides with the temperature distribution measured by the thermocouples. In addition, a temperature distribution over a wide range including the coiled portions A, B, C and D, and the vicinities thereof is successfully measured.

In any of Examples 1 and 2 described above, it may be seen that a corrected temperature distribution close to the true temperature distribution may be acquired from a temperature distribution before the correction, in which the temperature values are averaged spatially. In addition, as in Examples 1 and 2 described above, it may be possible to perform optimum installation of an optical fiber while an area in which a temperature distribution is to be understood, the length of the optical fiber usable per rack and the like are taken into consideration.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present inventions has been described in detail, it should be understood that the various changes, substitutions, and alterations could be made hereto without departing from the spirit and scope of the invention.

What is claimed is:

1. A temperature measurement system comprising:
a laser light source configured to output laser light;
an optical fiber which is installed in a temperature measurement area and which the laser light enters; and
a temperature measurement unit configured to acquire a measured temperature distribution of a temperature of the temperature measurement area along an installation path of the optical fiber by detecting backscattered light of the incident laser light in the optical fiber and to calculate a corrected temperature distribution of a temperature of the temperature measurement area by correcting the measured temperature distribution, wherein
the temperature measurement unit sequentially makes a correction for the measured temperature distribution a plurality of times and calculates the corrected temperature distribution the plurality of times so as to make a square error between a convolution of a transfer function of the optical fiber along the installation path and the corrected temperature distribution and the measured temperature distribution smaller in each of the corrections, and
the temperature measurement unit also replaces in each of the corrections a corrected temperature at a specific point of the installation path with an estimated temperature at the specific point, the corrected temperature being included in the corrected temperature distribution calculated in each of the corrections.

2. The temperature measurement system according to claim 1, wherein
the specific point includes a plurality of temperature measurement points existing in a section where the optical fiber is disposed in an overlapping manner, and
the estimated temperature is an average temperature for the plurality of temperature measurement points in the corrected temperature distribution.

3. The temperature measurement system according to claim 1, wherein
the specific point includes a plurality of temperature measurement points existing in a section kept at a constant temperature in the installation path, and
the estimated temperature is a temperature at one of the plurality of measurement points or an average temperature for the plurality of measurement points in the measured temperature distribution.

4. The temperature measurement system according to claim 3, wherein a length of the section is a length equal to or more than an absolute value of a third zero point of the transfer function of the optical fiber.

5. The temperature measurement system according to claim 1, wherein if the temperature measurement area includes a portion known to have a temperature equal to or higher than a predetermined temperature, a corrected temperature at the portion is replaced with the predetermined temperature, when the corrected temperature at the portion becomes lower than the predetermined temperature.

6. The temperature measurement system according to claim 1, wherein if the temperature measurement area includes a portion known to have a temperature equal to or lower than a predetermined temperature, a corrected temperature at the portion is replaced with the predetermined temperature, when the corrected temperature at the portion becomes higher than the predetermined temperature.

7. The temperature measurement system according to claim 1, wherein the temperature measurement area includes a region in a rack storing a plurality of computers therein in a computer room.

8. The temperature measurement system according to claim 7, wherein the optical fiber is disposed along an exhaust-side door of the rack.

9. The temperature measurement system according to claim 7, wherein the optical fiber includes a coiled portion outside the rack, and also includes a coiled portion at a position corresponding to an exhaust port of each of the computers stored in the rack.

10. A temperature measurement method comprising:
acquiring a measured temperature distribution of a temperature of a temperature measurement area along an installation path of an optical fiber by causing laser light to enter the optical fiber installed in the temperature measurement area and detecting backscattered light of the laser light in the optical fiber; and
acquiring a corrected temperature distribution of a temperature of the temperature measurement area by correcting the measured temperature distribution, wherein
in the acquiring the corrected temperature distribution, a correction is sequentially made for the measured temperature distribution a plurality of times and the corrected temperature distribution is sequentially calculated the plurality of times so as to make a square error between a convolution of a transfer function of the optical fiber along the installation path and the corrected temperature distribution and the measured temperature distribution smaller in each of the corrections, and
a corrected temperature at a specific point of the installation path is replaced in each of the corrections, with an estimated temperature at the specific point, the corrected temperature being included in the corrected temperature distribution calculated in each of the corrections.

11. The temperature measurement method according to claim 10, wherein in the acquiring the corrected temperature distribution, the correction is terminated when the amount of decrease in the square error becomes equal to or less than a predetermined value.

12. The temperature measurement method according to claim 10, wherein
the specific point includes a plurality of temperature measurement points existing in a section where the optical fiber is disposed in an overlapping manner, and
the estimated temperature is an average temperature for the plurality of temperature measurement points in the corrected temperature distribution.

13. The temperature measurement method according to claim 10, wherein
the specific point includes a plurality of temperature measurement points existing in a section kept at a constant temperature in the installation path, and
the estimated temperature is a temperature at one of the plurality of measurement points or an average temperature for the plurality of measurement points in the measured temperature distribution.

14. The temperature measurement method according to claim 10, wherein if the temperature measurement area includes a portion known to have a temperature equal to or higher than a predetermined temperature, a corrected temperature at the portion is replaced with the predetermined temperature, when the corrected temperature at the portion becomes lower than the predetermined temperature.

15. The temperature measurement method according to claim 10, wherein if the temperature measurement area includes a portion known to have a temperature equal to or lower than a predetermined temperature, a corrected temperature at the portion is replaced with the predetermined temperature, when the corrected temperature at the portion becomes higher than the predetermined temperature.

16. A temperature measurement apparatus comprising a temperature measurement unit configured to acquire a measured temperature distribution of a temperature measurement area along an installation path of an optical fiber by detecting backscattered light of incident laser light in the optical fiber, and to calculate a corrected temperature distribution of a temperature of the temperature measurement area by correcting the measured temperature distribution, wherein
the temperature measurement unit sequentially makes a correction for the measured temperature distribution a plurality of times and calculates the corrected temperature distribution the plurality of times so as to make a square error between a convolution of a transfer function of the optical fiber along the installation path and the corrected temperature distribution and the measured temperature distribution smaller in each of the corrections, and
the temperature measurement unit also replaces in each of the corrections, a corrected temperature at a specific point of the installation path with an estimated temperature at the specific point, the corrected temperature being included in the corrected temperature distribution calculated in each of the corrections.

17. The temperature measurement apparatus according to claim 16, wherein
   the specific point includes a plurality of temperature measurement points existing in a section where the optical fiber is disposed in an overlapping manner, and
   the estimated temperature is an average temperature for the plurality of temperature measurement points in the corrected temperature distribution.

18. The temperature measurement apparatus according to claim 16, wherein
   the specific point includes a plurality of temperature measurement points existing in a section kept at a constant temperature in the installation path, and
   the estimated temperature is a temperature at one of the plurality of measurement points or an average temperature for the plurality of measurement points in the measured temperature distribution.

19. The temperature measurement apparatus according to claim 16, wherein a length of the section is a length equal to or more than an absolute value of a third zero point of the transfer function of the optical fiber.

20. The temperature measurement apparatus according to claim 16, wherein if the temperature measurement area includes a portion known to have a temperature equal to or higher than a predetermined temperature, a corrected temperature at the portion is replaced with the predetermined temperature, when the corrected temperature at the portion becomes lower than the predetermined temperature.

* * * * *